United States Patent
Rivkin et al.

(10) Patent No.: US 9,286,916 B1
(45) Date of Patent: Mar. 15, 2016

(54) HIGH FREQUENCY DATA WRITER FIELD GENERATOR DEVICE

(71) Applicant: Seagate Technology LLC, Cupertino, CA (US)

(72) Inventors: Kirill Rivkin, Eden Prairie, MN (US); Mourad Benakli, Eden Prairie, MN (US); Huaqing Yin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/469,134

(22) Filed: Aug. 26, 2014

(51) Int. Cl.
*G11B 5/09* (2006.01)
*G11B 5/35* (2006.01)
*G11B 5/60* (2006.01)

(52) U.S. Cl.
CPC .. *G11B 5/09* (2013.01); *G11B 5/35* (2013.01); *G11B 5/6082* (2013.01)

(58) Field of Classification Search
None
See application file for complete search history.

(56) References Cited

U.S. PATENT DOCUMENTS

| | | | |
|---|---|---|---|
| 3,723,668 A * | 3/1973 | Ritchey, Jr. | H04N 5/781 360/66 |
| 5,621,580 A * | 4/1997 | Cruz | G11B 5/09 360/40 |
| 7,724,469 B2 | 5/2010 | Gao et al. | |
| 7,957,098 B2 * | 6/2011 | Yamada | G11B 5/02 360/125.3 |
| 8,174,937 B2 | 5/2012 | Ikeda et al. | |
| 8,228,632 B2 | 7/2012 | Gubbins et al. | |
| 8,270,112 B2 | 9/2012 | Funayama et al. | |
| 8,289,818 B2 * | 10/2012 | Taratorin | B82Y 15/00 360/59 |
| 8,300,346 B2 | 10/2012 | Ikeda et al. | |
| 8,351,155 B2 | 1/2013 | Contreras et al. | |
| 8,422,159 B2 | 4/2013 | Gao et al. | |
| 8,462,465 B1 | 6/2013 | Adachi et al. | |
| 8,547,656 B2 | 10/2013 | Igarashi et al. | |
| 8,582,239 B2 | 11/2013 | Soeno et al. | |
| 8,582,240 B1 * | 11/2013 | Chen | G11B 5/399 360/125.3 |
| 8,634,163 B2 | 1/2014 | Tanabe et al. | |
| 8,654,480 B2 | 2/2014 | Shimizu et al. | |
| 8,675,308 B2 | 3/2014 | Yamada et al. | |
| 8,755,150 B2 | 6/2014 | Chen et al. | |
| 2006/0198047 A1 * | 9/2006 | Xue | B82Y 25/00 360/122 |
| 2008/0112087 A1 * | 5/2008 | Clinton | G11B 5/02 360/317 |
| 2008/0304176 A1 * | 12/2008 | Takagishi | G11B 5/1278 360/86 |
| 2009/0052095 A1 * | 2/2009 | Yamada | G11B 5/02 360/324 |
| 2009/0262457 A1 | 10/2009 | Rivkin et al. | |
| 2010/0309577 A1 * | 12/2010 | Gao | G11B 5/02 360/75 |
| 2011/0128652 A1 * | 6/2011 | Taguchi | G11B 5/3133 360/123.12 |
| 2011/0205655 A1 * | 8/2011 | Shimizu | G11B 5/02 360/39 |
| 2011/0205667 A1 * | 8/2011 | Yamada | B82Y 10/00 360/122 |
| 2011/0228423 A1 * | 9/2011 | Koui | G11B 5/1278 360/75 |
| 2012/0176702 A1 * | 7/2012 | Yamada | G11B 5/1278 360/244 |
| 2012/0275061 A1 * | 11/2012 | Takagishi | G11B 5/02 360/123.05 |
| 2013/0070367 A1 * | 3/2013 | Igarashi | G11B 5/1278 360/75 |
| 2013/0286505 A1 * | 10/2013 | Fukuda | G11B 5/78 360/111 |

* cited by examiner

*Primary Examiner* — Peter Vincent Agustin
(74) *Attorney, Agent, or Firm* — Hall Estill Attorneys at Law

(57) ABSTRACT

A data writing device may be constructed and operated with at least a data writer that has at least a write pole and a magnetic feature. A controller may selectively activate the magnetic feature to magnetically oscillate and produce a radio frequency signal proximal the write pole on an air bearing surface (ABS).

20 Claims, 5 Drawing Sheets

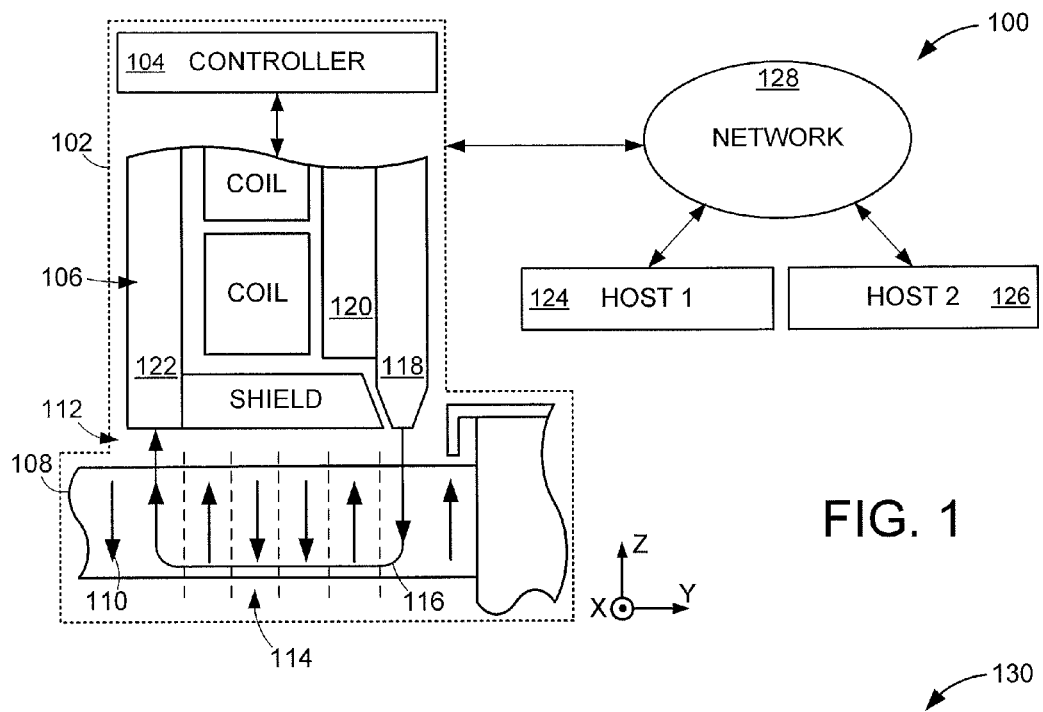
FIG. 1
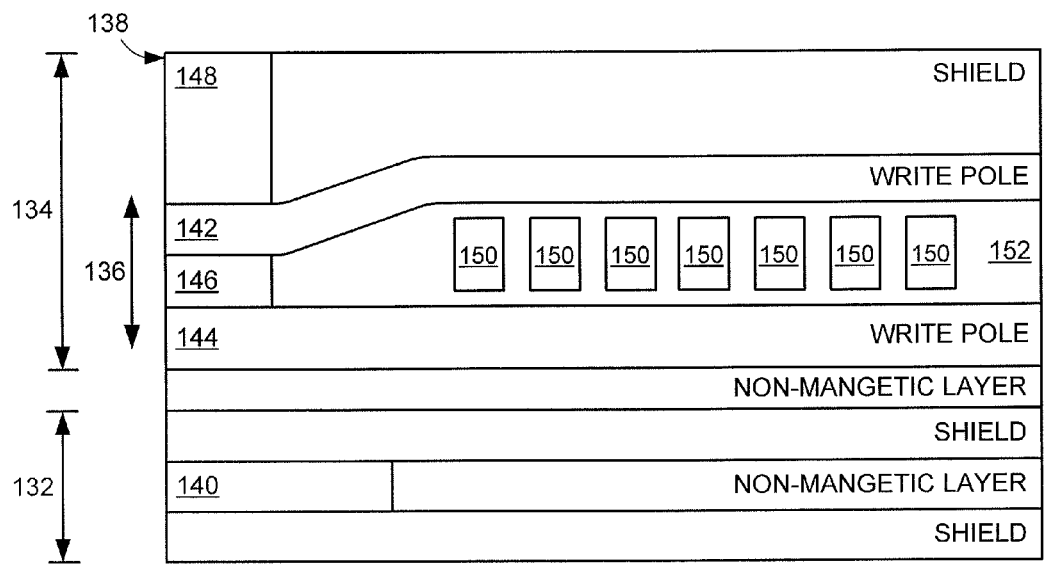
FIG. 2A
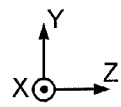

HIGH FREQUENCY DATA WRITER FIELD GENERATOR DEVICE

SUMMARY

Various embodiments of the present disclosure have at least a data writer configured with a write pole and a magnetic feature. A controller may selectively activate the magnetic feature to magnetically oscillate and produce a radio frequency signal proximal the write pole on an air bearing surface (ABS).

BRIEF DESCRIPTION OF THE DRAWINGS

FIG. 1 is a block representation of an example portion of a data storage system configured and operated in accordance with some embodiments.

FIGS. 2A and 2B respectively show cross-section and ABS view block representations of portions of an example data transducing assembly capable of being utilized in the data storage system of FIG. 1.

DETAILED DESCRIPTION

Figure 2B:
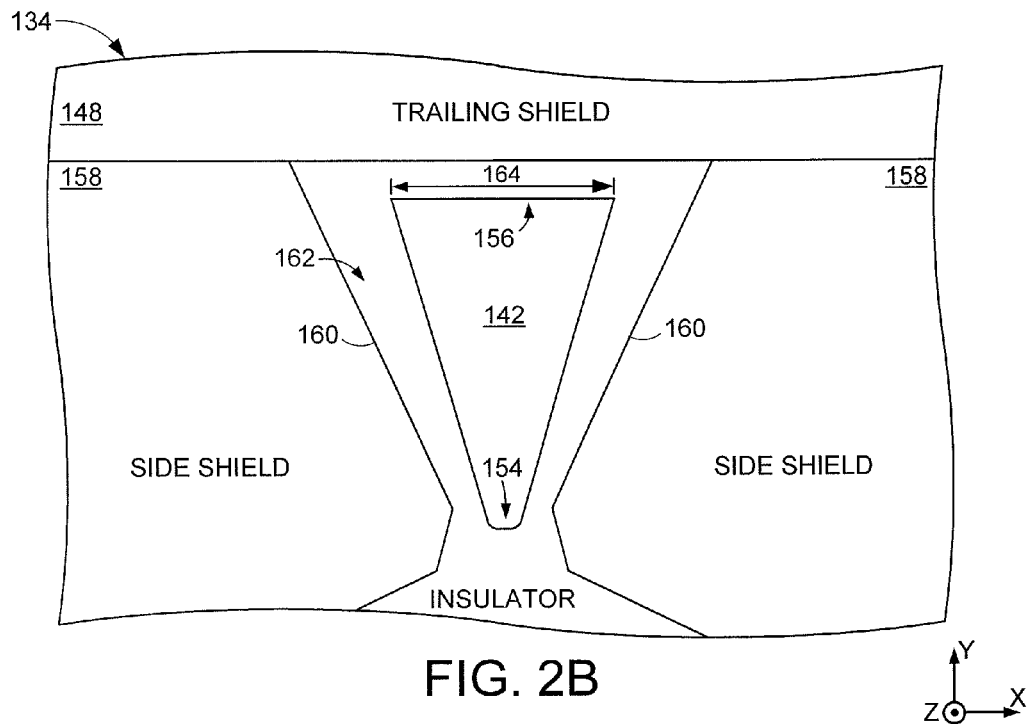

With increased industry and consumer demand for data storage, the areal density of data storage devices has stressed the physical structure and fabrication of data storage components like data writers and data readers. Microwave assisted magnetic recording (MAMR) may provide a viable supplement to data writers by providing nonlinear resonant interactions between data media and a high frequency magnetic field to optimize the scale and speed of data bit programming. The co-location of high frequency magnetic field gradients and DC data writing field gradients can increase the effective gradient of the data writer, which can decrease the physical size of a data track and heighten the efficiency of data bit programming.

However, the localization and amplitude of a high frequency magnetic field can be difficult to accurately manufacture, can induce inadvertent data erasure, and can diminish the amount and gradient of the magnetic field generated. For example, positioning a wire close to a write pole can be difficult to preserve spatial cohesion over a large volume due to non-linear effects. Hence, there is an interest in a data writer configured to generate concentrated, high power radio frequency magnetic fields that can increase data writing field gradient and allow the accurate programming of data bits in high areal density environments.

With these issues in mind, a data storage device may be configured with a data writer that has at least a write pole and a magnetic feature along with a controller that selectively activates the magnetic feature to magnetically oscillate and produce a radio frequency signal proximal the write pole on an air bearing surface (ABS). The ability to generate oscillating magnetic signals by selectively activating the magnetic feature allows high frequency signals to complement the DC data writing magnetic fields in the write pole to provide large data programming gradients. Such large data programming gradients can allow increased data bit areal density and optimized data programming performance due at least to heightened data writing precision.

A data writer is not limited to a particular environment or device. However, a data writer can be incorporated into the example tuned data storage system 100 in accordance with various embodiments. The data storage system 100 may have one or more data storage devices 102 that are similarly or dissimilarly configured to store data in rotating, solid state, and hybrid data environments. Regardless of the type, size, and speed of a data storage device 102, a local controller 104 and memory, such as a cache memory, can operate a transducing assembly 106 to write data to, and retrieve data from, one or more data medium 108.

It is contemplated that the data medium 108 is configured to store data bits 110 longitudinally with respect to an air bearing 112, along the Z axis. The transducing assembly 106 can float on the air bearing 112 to program and retrieve data bits 110 positioned in data tracks 114 with one or more data transducing means, like a data writer and data reader. During data programming, a data writer transducing means generates a magnetic writing circuit 116 by generating magnetic flux with a writer coil and passing the magnetic flux to a main write pole 118 through a magnetic yoke 120, which is subsequently received by one or more return poles 122 to complete the magnetic writing circuit 116 and impart a predetermined magnetic polarity as a data bit 110.

The data storage device 102 can be configured to operate locally via the local controller 104 and remotely via one or more remote hosts 124 and 126, such as a controller, node, and server, through a network 128 accessed by appropriate protocol. The ability to control a data storage device 102 locally and remotely can allow the data storage system 100 to be utilized in a diverse variety of computing environments, such as storage clouds, smartphones, tablets, laptops, servers, and desktop devices. Remote data storage system 100 configurations can allow the data storage device 102 to be accessed more efficiently, often, and by more hosts than stand-alone computing environments. Such efficient data storage access can increase the amount of data being stored in a data storage device 102.

In order to increase the data storage capacity of the data storage device 102, the data bits 110 and corresponding data tracks 114 can be configured to be smaller, which increases the number of data bits 110 on the data medium 108. Reducing the size of the data bits 110 and tracks 114 can be more difficult to accurately program. Hence, auxiliary data recording means, such as MAMR configurations, can be tuned to increase data programming accuracy. For example, the data storage device 102 can be configured to employ MAMR means that increase signal-to noise ratio by allowing smaller data bit grains while maintaining thermal stability as well as raising anisotropy. The MAMR means may further allow for a decrease the size of the write pole 118, which may reduce data track inflation while maintaining good write pole 118 field gradient.

FIGS. 2A and 2B respectively illustrate cross-section and air bearing surface (ABS) view block representations of portions of an example transducing head 130 configured in accordance with some embodiments and capable of being utilized in the data storage device 102 of FIG. 1. The transducing head 130 can have one or more magnetic elements, such as the magnetic reader 132 and writer 134, which can operate individually, or concurrently, to write data to or retrieve data from adjacent storage media, such as medium 108 of FIG. 1. Each magnetic element 132 and 134 may be constructed of a variety of shields and a transducing elements that interact with predetermined data tracks 136 of the storage media across an air bearing surface 138 (ABS).

As displayed, the magnetic reading element 132 has a magnetoresistive (MR) lamination 140 disposed between leading and trailing shields. The writing element 134 has a write (main) pole 142 and a return pole 144 that create a writing circuit to program at least one data bit on the adjacent storage medium. The return pole 144 is separated from the write pole 142 by a gap shield 146 while a magnetic shield 148 is positioned adjacent to the write pole 142. At least one non-magnetic layer can separate the magnetic writer 134 from the magnetic reader 132, which may be in combination with one or more shield layers configured as part of the respective writer 134 and reader 132.

The writing element 134 comprises a coil 150 that can be one or many individual wires capable of imparting a magnetic flux on the write pole 142 to travel through the write circuit that concludes at the return pole 144. Additional insulating material 152 may surround the coil 150, write pole 142, and MR lamination 140 to prevent leakage of magnetic flux. The shields of the transducing head 130 can be characterized by their position with respect to the timing of encountering external bits, such as bits 110 of FIG. 1. That is, shields that encounter the external bits before the transducing elements 132 and 134 are "leading" shields while shields that see the bits after the transducing elements are "trailing" shields. Such characterization extends to the difference between "upstream" or "downstream" of the transducing elements in that, depending on the direction of travel for the head 130 and external bits, the shields can be either leading or trailing and either upstream or downstream.

FIG. 2B displays a portion of the magnetic writer 134 from air bearing surface 138. The ABS view shows how the write pole 142 can be configured into a geometric shape, such as, but not limited to, the trapezoid shown in FIG. 2B. A tuned write pole 142 shape can aid in funneling magnetic flux to leading 154 and trailing 156 edges of the write pole 142. The non-rectangular tuned shape of the write pole 142 can be complemented by side shields 158 that are respectively tuned to have sidewalls 160 tapered with respect to the Y axis. The side shields 158 can be configured to extend partially or completely around the leading edge 154 of the write pole 142 while being separated from the write pole 142 by one or more non-magnetic insulating materials.

The insulating material can continuously extend about the write pole 142 to provide a write gap 162 that may be uniform, or varying in the downtrack (Y axis) and cross-track (X axis) directions. The write gap 162 may separate the write pole 142 from the trailing shield 148 and various embodiments may configure the trailing shield 148 to contact at least one side shield 158. The tuned construction and operation of the shields and write gap 162 can operate with a reduced total pole width trailing (TPWT) 164 in reducing the magnetic writing extent of the data writer 130 to correspond with high data bit areal density data storage environments. However, reducing the write gap distance 166 can compromise increases in magnetic shielding by raising the risk of magnetic shunting that robs the write pole 142 of magnetic flux and decreases data writing performance.

Figure 3:
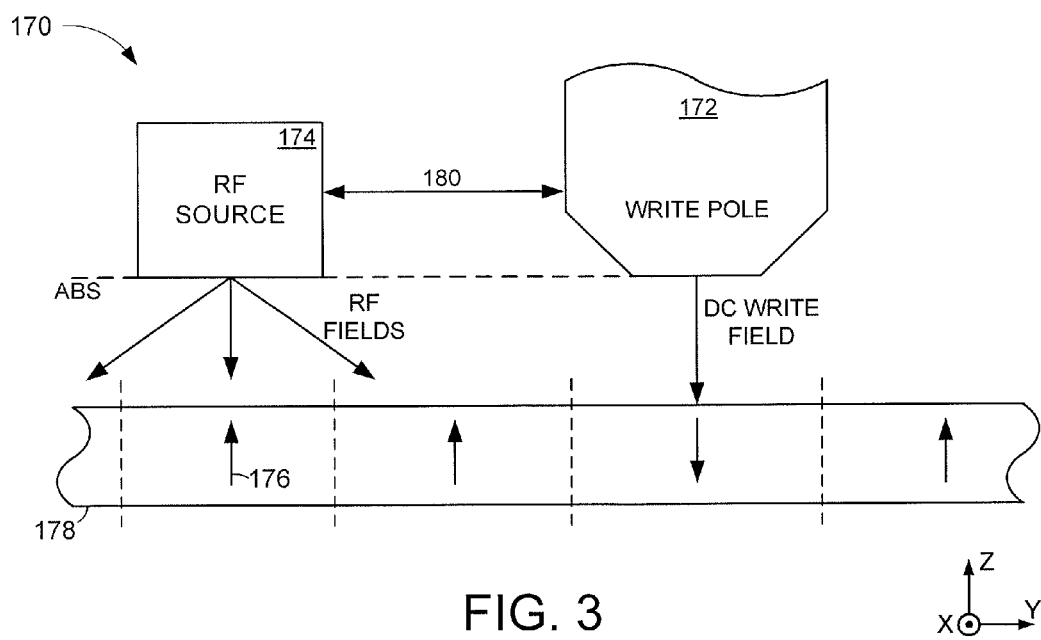
FIG. 3 displays a block representation of a portion of an example data writer constructed in accordance with various embodiments.

With industry and consumer interest driving increased data bit areal density and data access speeds, MAMR means may be tuned to complement data writer shielding configurations like that shown in FIGS. 2A and 2B. FIG. 3 shows a block representation of a portion of an example data writer 170 configured in accordance with some embodiments. A write pole 172 may emit direct current (DC) magnetic write fields generated by a write coil while a radio frequency (RF) source 174 emits frequencies that utilize nonlinear resonant interactions between the data bits 176 of the data storage medium 178 and the DC write field to optimize data programming efficiency.

The ability to concurrently and sequentially utilize predetermined frequency ranges, such as microwave frequencies from 0.3-300 GHz, can allow data bit 176 grains on the storage medium 178 to be constructed with greater density, which corresponds with higher data capacity and resolution. It is contemplated that smaller data bit 176 grains can increase the signal-to-noise ratio (SNR) by maintaining thermal stability with increased anisotropy compared to larger data bit 176 grains. In yet, fabrication of smaller data bit 176 grains with reasonable distribution of material properties can be difficult to attain with reasonable efficiency.

Tuned configuration and operation of the RF source 174 may also complement a reduced TPWT of the write pole 172 by programming data tracks on the storage medium 178 that are more narrow, but with the same writeability as non-MAMR assisted data writers. The RF source 174 allows for reduced data track inflation by decreasing the width of data tracks on the storage medium 176 to be substantially the same as the TPWT of the write pole 172. MAMR assisted data writing may also maintain good writing field gradient despite a reduced TPWT, which corresponds with the effective gradient relying on the gradient of the DC write field as well as the interaction of the data bits 176 with the MAMR frequency.

The co-location of high frequency RF signals along with the DC write fields on the ABS can optimize the effective write gradient of the data writer 170. However, the localization and amplitude of the RF signals with respect to the DC write fields can pose data writing performance challenges. For instance, direct generation of RF signals by a wire may be straightforward to fabricate, but may suffer from dispersed RF fields, erasure conditions, and field amplitude limited to about 1000 Oe. That is, the RF signal and maximum write field may be difficult to co-locate and may result in inadvertent erasure of data bits and degradation of downtrack write gradient.

It is contemplated that magnetic oscillators, such as a spin torque oscillator (STO), may be positioned a predetermined distance 180 from the write pole 172 on the ABS, such as contacting the write pole 172 or in a write gap of a data writer, to generate an RF field. Although circularly polarized RF fields and co-location of RF and DC gradients can increase data writing performance, the RF field's polarization and amplitude can be small and heighten the risk of data erasure due at least to weak gradient in within the storage medium 178 and delocalized field in high field amplitudes. The construction of an STO may be difficult and can increase interactions between the write pole 172 and a magnetic shield, such as a leading shield, which can diminish the amount and gradient of a write field.

Alternatively, a wire may be positioned close to the ABS to directly activate gigahertz precession in the write pole 172. However, semi-static flux in the write pole 172, such a greater than 12000 Oe flux, can be difficult to counteract. Meanwhile, spatial cohesion of high angle magnetic oscillations over large volumes due to non-linear effects may be difficult to preserve with wire MAMR means directed to activate write pole 172 precession. Accordingly, various embodiments of the present disclosure generate concentrated, high power RF fields with MAMR means in a write gap proximal the write pole 172 with at least one magnetic feature.

Figure 4:
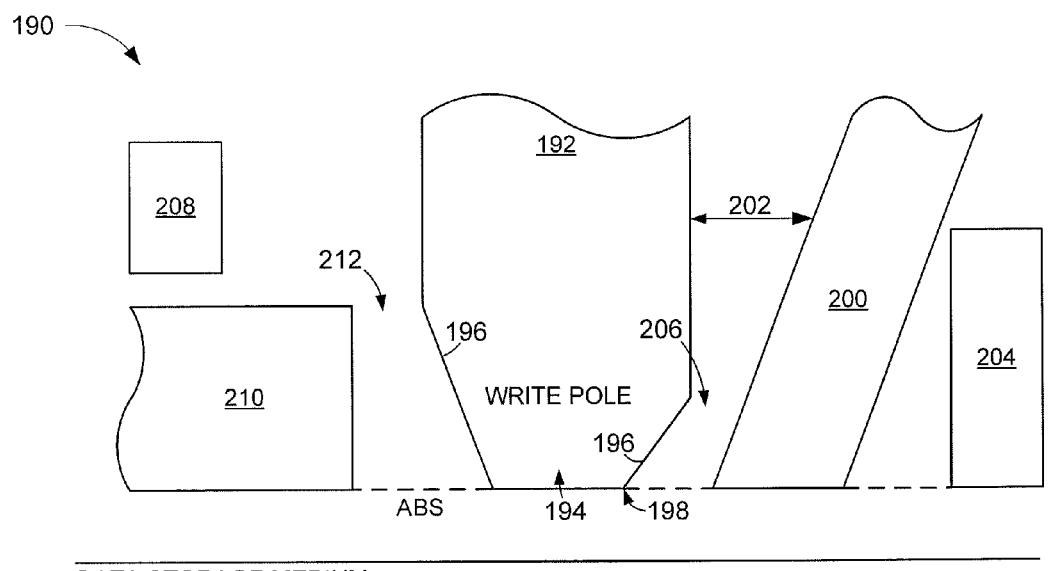
FIG. 4 illustrates a block representation of a portion of an example data writer configured in accordance with some embodiments.

FIG. 4 displays a block representation of a portion of an example data writer 190 tuned in accordance with various embodiments to generate an RF field capable of stronger and more uniform precessions of magnetization compared to other MAMR means. The data writer 190 may have one or more write poles 192 that are shaped proximal the ABS in a write pole tip 194. The write pole tip 194 may be tuned with a plurality of similarly or dissimilarly tapered tip sidewalls 196 angled with respect to the Z axis. The tuned write pole tip 194 may aid data programming efficiency by funneling magnetic flux to a predetermined portion of the write pole 192, such as the leading edge 198.

The magnetic extent of the write pole 192 may be defined, at least partially, by a front shield 200, which can be tuned to be an unlimited variety of shapes and sizes extending from the ABS. the parallelogram shaped front shield 200 shown in FIG. 4 may provide increased data writing performance by balancing the proximity of the front shield 200 from the write pole tip 194 on the ABS with the distance 202 from the write pole 192 distal the ABS. The shape and size of the front shield 200 may further be tuned to more efficiently generate RF fields via activation from an adjacent, but physically separated, magnetic feature 204 on the ABS.

Various embodiments configure the magnetic feature 204 to be a magnetic material, such as copper, that can be electrically activated and deactivated to magnetically oscillate the front shield 200. That is, electrical activation of the magnetic feature 204 can cause undershoot in the front shield 200 that strongly oscillates the shield 200 and produces RF field components that are oriented longitudinal to write fields in the write gap 206. In other words, the tuned proximity of the magnetic feature 204 and the front shield 200 allows the shield 200 to be magnetically oscillated by the magnetic feature 204 and generate RF fields that complement DC write fields from the write pole 192 and provide a relatively flat amplitude versus frequency response with frequencies above 10 GHz.

The utilization of the magnetic feature 204 to magnetically oscillate the front shield 200 to produce an RF field differs from the magnetic feature 204 generating the FR field directly. It can be appreciated that the oscillation of the front shield 200 instead of the magnetic feature 204 proximal the write gap 206 provides co-location of the RF and DC fields in a manner that can provide 1000 Oe or greater RF fields that demonstrate optimized data writing performance.

It should be noted that the magnetic feature 204 configuration is not required or limiting for generating RF fields that optimize data writing performance. Magnetic feature 208 illustrates how an electrically and magnetically conductive material can be positioned distal the ABS and proximal a trailing shield 210. The physically separated position and size of the magnetic feature 208 can be tuned to magnetically oscillate the trailing shield 210 to produce RF fields in the trailing write gap 212 that can complement DC write fields and optimize data bit programming.

Although not required or limiting, the magnetic features 204 and 208 may be concurrently operated in similar or dissimilar manners to produce different RF fields in the write gaps 206 and 212 that operate to increase data writing efficiency in view of the DC write fields provided by the write pole 192. The ability to tune the size, shape, and position of the shields 200 and 210 with respect to the write pole tip 194 allows for the RF fields generated from magnetic oscillation to be tuned and catered to the respective leading and trailing positions of the shields 200 and 210. For clarification, RF fields can be customized by the physical configuration of the shields, such as 2.4T magnetic material, shape, and distance from the write pole tip 194, as well as by the magnetic oscillation provided by the magnetic features 204 and 208 to provide different leading and trailing edge RF field profiles that can optimize DC write fields.

Figure 5:
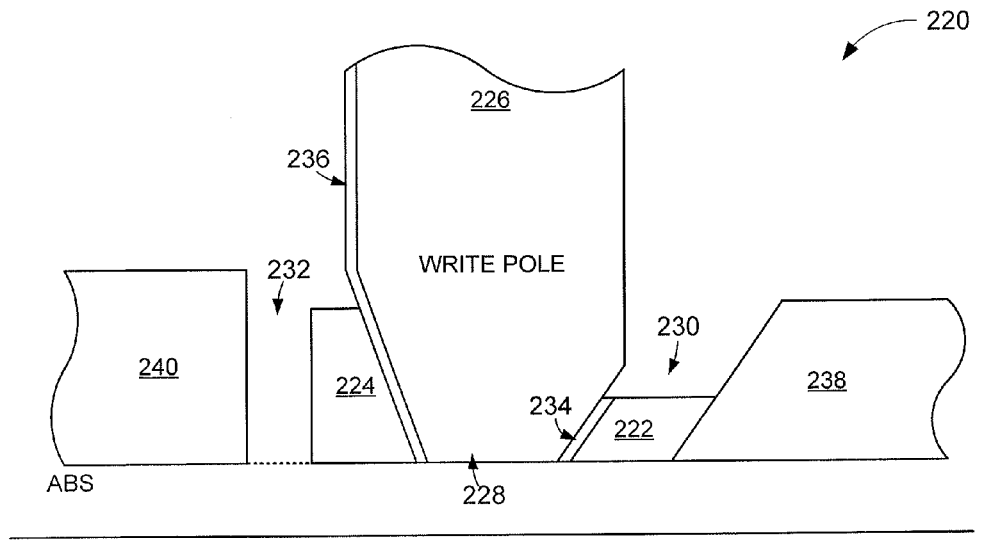
FIG. 5 provides a block representation of a portion of an example magnetic writer tuned in accordance with various embodiments.

It is to be understood that the magnetic features 204 and 208 are not limited to the configurations shown in FIG. 4. FIG. 5 provides a block representation of a portion of an example data writer 220 configured in accordance with some embodiments to employ magnetic features 222 and 224 on opposite respective sides of a write pole 226 on the ABS. The leading side magnetic feature 222 can be characterized as a shunt in some configurations by being constructed of a low Curie temperature, such as 100-200° C., material positioned in a write gap proximal the write pole tip 228 of the write pole 226. For example, a ferromagnetic material like Co or Fe can be doped with a non-magnetic metal like Cu, Au, and Ag to construct a magnetic feature or alloys with rare earth elements like gadolinium can serve as a magnetic feature in accordance with various embodiments with magnetic saturations of approximately 0.5-1T.

The magnetic features 222 and 224 can be heated and cooled through activation and deactivation of one or more control lines to generate RF fields in the write gaps 230 and 232 that can optimize data bit programming. More specifically, current supplied to one, or both, magnetic features 222 and 224 can raise the feature's temperature above its Cure temperature so that the material transitions from a ferromagnet to a weak paramagnet, which results in a change of magnetic field proximal the feature 222 and 224. The tuned activation and deactivation of the respective magnetic features 222 and 224 can generate RF charges on the surface of the features 222 and 224 that can be 1000 Oe or greater. In other words, heating and cooling the magnetic features 222 and 224 in a predetermined pattern can produce RF fields that complement DC write fields and optimize data writing via being well co-located and having good downtrack gradient.

It is contemplated that the activation and deactivation of a magnetic feature 222 and 224 can be very fast, such as on a picosecond scale, which can produce very high flux density that can inhibit the duration of transient processes. As such, up until a 10 GHz RF field is generated, flat response between RF field amplitude and frequency can be experienced. However, it is possible that the generation of RF fields by the magnetic features 222 and 224 may reduce the DC write field component by approximately the same amplitude as the created RF field. Yet, the increase in writing field gradient and data bit writeability provided by generated RF fields may outweigh the reduction in RF field amplitude.

The continuous, sporadic, or random heating and cooling of the magnetic features 222 and 224 may heat the write pole 226, such as up to 40% of the feature's temperature, which can diminish write pole efficiency. Accordingly, a non-magnetic metallic material can form a conductive barrier that can be disposed between the magnetic features 222 and 224 and the write pole 226. As shown, a conductive barrier can continuously extend from the ABS up to the magnetic feature 222, such as barrier 234, and beyond the magnetic feature 224 along the Z axis, such as barrier 236, to provide a predetermined degree of write pole 226 cooling.

It should be noted that magnetic feature 222 is configured to contact the write pole 226 as well as a front shield 238 on the ABS while magnetic feature 224 contacts the write pole 226 without contacting the trailing shield 240 on the ABS. Although a single magnetic feature or similarly configured magnetic features may be utilized in the data writer 220, various embodiments tune leading and trailing magnetic features to different configurations to provide different RF fields catered to the DC write fields present in the respective leading and trailing sides of the write pole tip 228. For instance, the physical separation of the trailing shield 240 from magnetic feature 224 can operate with the larger size of the magnetic feature 224 to generate RF fields with different characteristics, such as orientation and amplitude, than magnetic feature 222 that contacts the front shield 238.

In a non-limiting embodiment, a shield oscillating magnetic feature, such as feature 204 of FIG. 4, is employed simultaneously with a shunt magnetic feature, such as feature 222 of FIG. 5, to tune the generation of RF fields in the write gaps 230 and 232 about the write pole 226 on the ABS. For example, a conductive wire may oscillate the front shield 238 concurrently and sequentially with magnetic feature 222 oscillation to provide RF fields that optimize DC write fields on the leading side of the write pole 226 to increase data writing performance. The ability to selectively tune the generation of RF fields on the leading and trailing sides of the write pole 226 can provide concentrated, high power RF fields that excite adjacent data bits and allow for data bit programming with reduced time and programming current.

Figure 6:
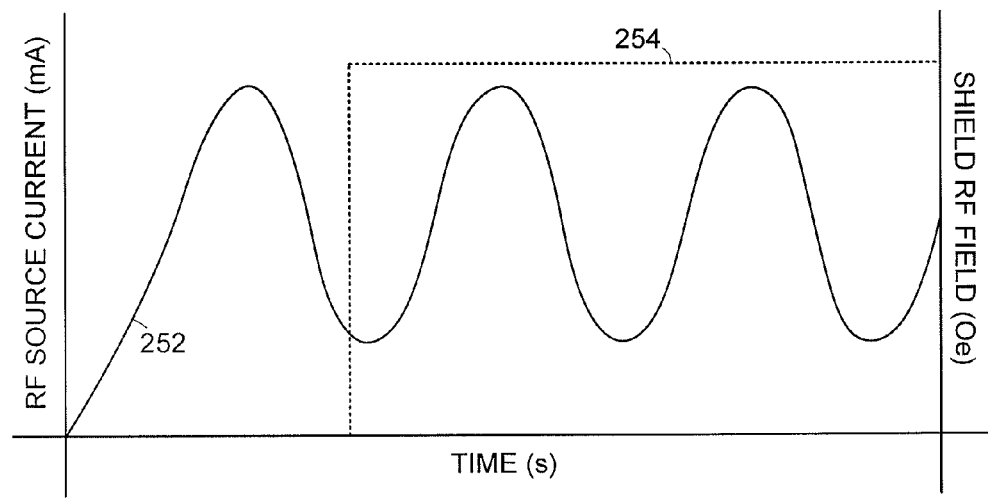
FIG. 6 plots data corresponding to a data writer tuned in accordance with some embodiments.

FIG. 6 plots various operational capabilities of an example data writer constructed with at least one magnetic feature tuned to generate RF fields, such as microwave frequency signals, in a write gap proximal a write pole on an ABS. Solid line 252 illustrates how a wire magnetic feature, such as feature 204 of FIG. 4, can selectively oscillate through the adjustment of current in the feature. The rise and fall of current in the magnetic feature can correspond with a predetermined frequency that causes an adjacent magnetic shield to oscillate and generate an RF field, as displayed by segmented line 254.

The ability to control the current of the magnetic element allows for diverse shield oscillations that produce a range of RF fields. For example, the magnetic feature may be oscillated at a frequency that is different than the adjacent magnetic shield and the RF field generated by the magnetic shield. Through tuned manipulation of the magnetic feature, the oscillations of the magnetic shield can be controlled to produce a variety of different write gap fields within a range of radio frequencies, which can allow data writing systems to be catered to data bit environments that change over time, such as through decreased data storage medium rotational speed or decreased data bit resolution.

Figure 7:
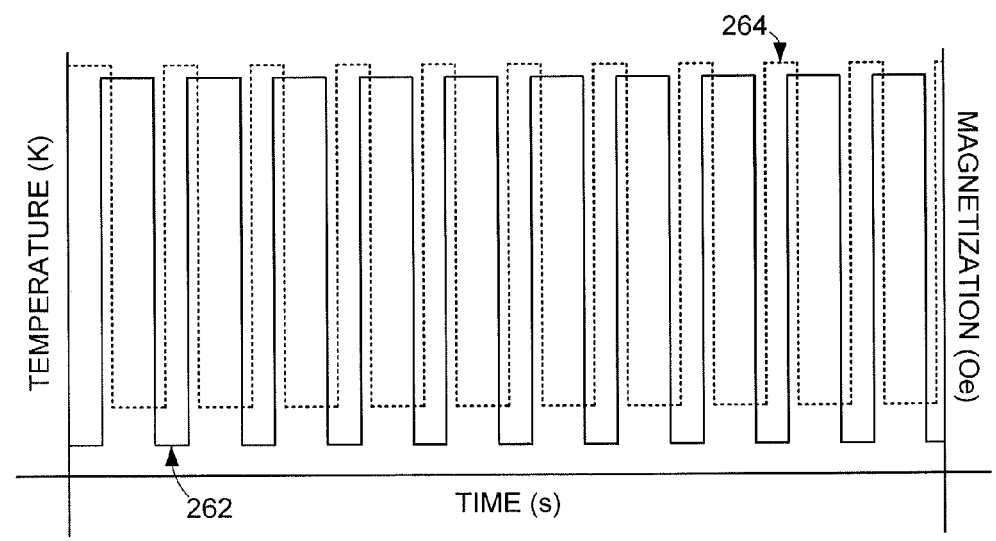
FIG. 7 graphs data for at least one magnetic feature configured in accordance with various embodiments.

FIG. 7 plots operational characteristics for an example magnetic feature tuned to generate an RF field in a write gap around a write pole in accordance with various embodiments. The controlled operation of a shunt magnetic feature, such as feature 222 of FIG. 5, is illustrated by solid line 262 that oscillates between high and low temperatures through selective activation and deactivation by one or more controllers. The repeated heating and cooling of the magnetic feature generates RF charges on its surfaces and an RF field in the write gap, which is represented by segmented line 264.

It should be noted that the activation of the magnetic feature can be tuned to be very fast so that the flux density of the magnetization limits the duration of transient processes. As such, controlling the ferromagnetic/paramagnetic properties of the magnetic feature can tune the RF field produced in the write pole write gap, which can optimize data programming performance. In some embodiments, the frequency at which the magnetic feature is heated and cooled can be actively changed to modify the RF field being generated and the manner in which the magnetic feature interacts with the DC write field of the write pole.

Figure 8:
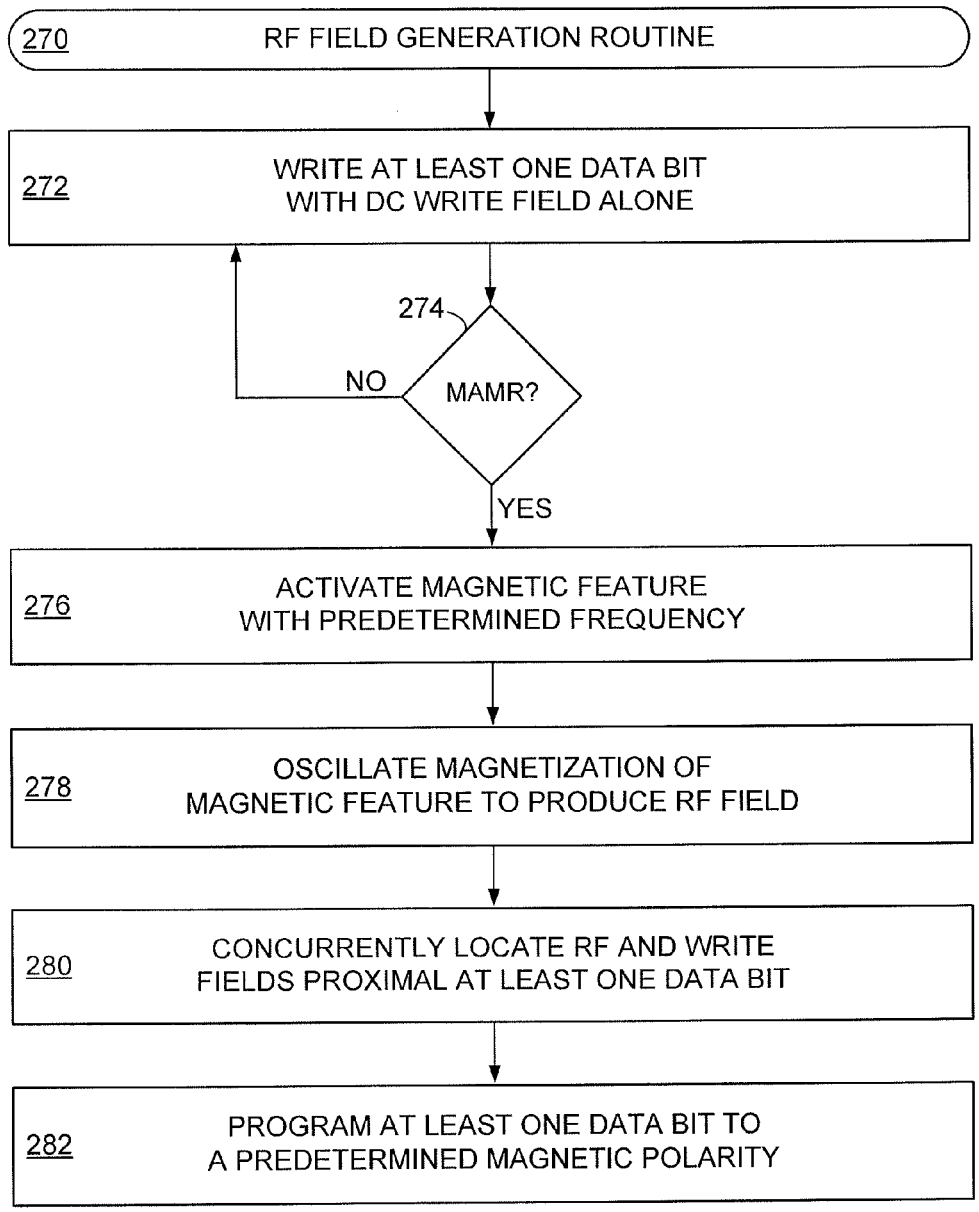
FIG. 8 is a flowchart of an example RF field generation routine carried out in accordance with various embodiments.

Turning to FIG. 8, an example RF field generation routine 270 is shown as conducted in accordance with various embodiments. Initially, step 272 can write at least one data bit with a DC write field alone. The DC write field may be used to program system overhead, like servo and error correction codes, before and after end-user data has been written. It is contemplated that a magnetic feature capable of generating microwave frequency fields is not utilized during all data bit programming. Accordingly, decision 274 evaluates whether MAMR operations are to be conducted. In the event no MAMR data writing is called for, step 272 is again executed for the programming of at least one more data bit before decision 274 is revisited.

Before, during, and after step 272, step 276 can activate one or more magnetic features, such as the wire magnetic features of FIG. 4 and shunt magnetic features of FIG. 5, with a predetermined frequency. The predetermined frequency may be different or the same as the microwave frequency generated in the write gap, as illustrated in the graphs of FIGS. 6 and 7. The activation of the magnetic feature in step 276 can oscillate magnetization of the magnetic feature in step 278 immediately and over time to produce an RF field proximal a write pole on the ABS. It can be appreciated that the oscillation of the magnetic feature in step 278 may generate the RF field by itself or via an intermediary magnetic shield, such as front shield 200 of FIG. 4.

The generated RF fields may then be co-located with one or more DC write fields on the ABS and proximal at least one data bit in step 280 to excite the data bit with resonance to allow step 282 to program the at least one data bit with a predetermined magnetic polarity with less write current and write time than non-MAMR assisted DC write field data bit programming. The tuned excitation and programming of data bits with routine 270 can optimize data writing performance. The ability to selectively utilize MAMR data programming can allow a data storage device controller to customize data bit programming to the type, writing speed, and priority of the data to be written. For instance, high priority data may be programmed more slowly by DC write fields alone while low priority data may be written faster with co-located DC and RF fields.

It should be noted that the various aspects of routine 270 are not required or limiting. As such, steps and decisions may be altered, removed, and added without limitation. For example, decisions and steps may be added that selectively generate a secondary RF field in the write pole write gap at the trailing edge of the write pole.

Through the tuned placement and operation of at least one magnetic feature, DC write fields of a write pole can be complemented to optimize data programming performance. The generation of RF fields in a write gap adjacent a write pole via a shunt magnetic feature or an activated magnetic shield allows for efficient excitation of data bits and data writing. With the generation of RF fields via controlled activation of a magnetic feature, relatively flat field amplitude versus frequency response for the generated field can be attained, which can efficiently produce concentrated, high power microwave frequencies without limiting DC write fields.

While the embodiments herein have been directed to data bit programming, it will be appreciated that the various embodiments can readily be utilized in any number of other applications, including solid-state data storage applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising a data writer comprising a write pole separated from a magnetic feature by a magnetic shield on an air bearing surface (ABS), a controller configured to heat and cool the magnetic feature to magnetically oscillate the magnetic shield to produce a radio frequency signal proximal the write pole on the ABS.

2. The apparatus of claim 1, wherein the magnetic feature comprises a conductive wire.

3. The apparatus of claim 1, wherein the magnetic feature is positioned proximal a leading edge of the write pole on the ABS.

4. The apparatus of claim 1, wherein the magnetic shield is disposed between the magnetic feature and the ABS.

5. The apparatus of claim 4, wherein the magnetic feature is physically separated from the magnetic shield.

6. The apparatus of claim 1, wherein the magnetic feature is positioned proximal a trailing side of the write pole.

7. The apparatus of claim 1, wherein the radio frequency is a microwave frequency.

8. The apparatus of claim 1, wherein the magnetic shield comprises a material having a 2.4 T magnetic saturation.

9. An apparatus comprising a data writer comprising a write pole, first magnetic feature, and second magnetic feature, the first magnetic feature separated from the write pole by a first magnetic shield on an air bearing surface (ABS), the second magnetic feature separated from the write pole and from the ABS by a non-magnetic layer, a controller configured to cyclically heat and cool at least one magnetic feature to magnetically oscillate the first magnetic shield and produce a radio frequency signal in a write gap proximal the write pole on the ABS.

10. The apparatus of claim 9, wherein the second magnetic feature comprises a shunt.

11. The apparatus of claim 10, wherein the shunt comprises a ferromagnetic material doped with a non-magnetic metal.

12. The apparatus of claim 10, wherein the shunt comprises gadolinium.

13. The apparatus of claim 9, wherein the first magnetic feature is positioned on a leading side of the write pole and the second magnetic feature is positioned on a trailing side of the write pole.

14. The apparatus of claim 9, wherein the first and second magnetic features are different materials and generate radio frequency signals differently.

15. The apparatus of claim 9, wherein the first magnetic feature and write pole each contact a non-magnetic conductive barrier that separates the first magnetic feature from the write pole on the ABS.

16. The apparatus of claim 9, wherein the first magnetic shield is positioned closer to the write pole on the ABS than distal the ABS.

17. A method comprising:
configuring a data writer with a write pole separated from a magnetic feature on an air bearing surface (ABS) by a magnetic shield; and
activating the magnetic feature selectively with a controller by repeatedly heating and cooling the magnetic feature to magnetically oscillate the magnetic shield and produce a radio frequency signal proximal the write pole on the ABS.

18. The method of claim 17, wherein heating and cooling the magnetic feature with a predetermined frequency generates the radio frequency signal in a write gap adjacent the write pole on the ABS.

19. The method of claim 17, wherein the magnetic feature causes undershoot and magnetic oscillation in a magnetic shield to generate the radio frequency signal.

20. The method of claim 17, wherein the radio frequency signal uses non-linear resonant interactions with at least one data bit of an adjacent data storage medium to increase data programming efficiency.

* * * * *